(12) United States Patent
Wood (10) Patent No.: US 7,487,047 B2
(45) Date of Patent: Feb. 3, 2009

(54) METHOD OF INTERPRETING WELL DATA

(75) Inventor: Rachel Wood, Edinburgh (GB)

(73) Assignee: Schlumberger Technology Corporation, Cambridge, MA (US)

( * ) Notice: Subject to any disclaimer, the term of this patent is extended or adjusted under 35 U.S.C. 154(b) by 0 days.

(21) Appl. No.: 11/691,538

(22) Filed: Mar. 27, 2007

(65) Prior Publication Data

US 2007/0260403 A1 Nov. 8, 2007

(30) Foreign Application Priority Data

Mar. 29, 2006 (GB) ................................ 0606223.6

(51) Int. Cl.
*G01V 1/40* (2006.01)

(52) U.S. Cl. ............................ 702/12; 702/10; 702/11; 166/250.02; 175/40; 175/50; 175/48; 73/152.05

(58) Field of Classification Search ...................... 702/6, 702/7, 11, 12, 13, 2, 9, 10; 166/384, 187, 166/191, 250.01, 254.1, 250.1, 754.1, 385, 166/298, 252.5, 250.02, 250.07, 250.08; 175/40, 50, 48, 230, 45; 73/152.02, 152.03, 73/152.45, 152.05; 340/855.6, 855.7; 367/30, 367/32

See application file for complete search history.

(56) References Cited

U.S. PATENT DOCUMENTS

| 4,729,960 | A | | 3/1988 | Foote | |
|---|---|---|---|---|---|
| 5,458,192 | A | * | 10/1995 | Hunt | 166/250.1 |
| 5,784,333 | A | * | 7/1998 | Tang et al. | 367/30 |
| 6,366,859 | B1 | * | 4/2002 | Rabiller et al. | 702/8 |
| 6,405,136 | B1 | * | 6/2002 | Li et al. | 702/10 |
| 6,470,274 | B1 | * | 10/2002 | Mollison et al. | 702/7 |
| 7,133,777 | B2 | * | 11/2006 | Goswami et al. | 702/6 |
| 2005/0240349 | A1 | * | 10/2005 | Goswami et al. | 702/6 |
| 2006/0033023 | A1 | * | 2/2006 | Pemper et al. | 250/269.6 |

FOREIGN PATENT DOCUMENTS

GB 2 288 017 A 10/1995

OTHER PUBLICATIONS

Akbar et al Classic interpretation problems: evaluating carbonates Schlumberger Oilfield Review, Jan. 1995, pp. 38-57.
Borgomano et al The lower Aptian Shuaiba carbonate outcrops in Jebel Akhdar, northern Oman: impact on static modeling for Shuaiba petroleum reservoirs AAPG Bulletin (American Association of Petroleum Geologists), vol. 86, No. 9, 2002, pp. 1513-1529.
Choquette et al Geologic nomenclature and classification of porosity in sedimentary carbonates American Association of Petroleum Geologists Bulletin, vol. 54, No. 2, 1970, pp. 207-250.

(Continued)

*Primary Examiner*—Carol S Tsai
(74) *Attorney, Agent, or Firm*—Steven Gahlings; James McAleenan; Jody Lynn DeStefanis (57) ABSTRACT

The present invention provides method for detecting the possible presence of surfaces layers of diagenetic origin by establishing divergence between well signatures such as logs, particularly for use in predominantly carbonate reservoirs.

15 Claims, 5 Drawing Sheets

OTHER PUBLICATIONS

Dunham Classification of carbonate rocks according to depositional texture American Association of Petroleum Geologists, vol. M 1, 1962, pp. 108-121.

Koesoemadinata et al Effects of diagenetic processes on seismic velocity anisotropy in near-surface sandstone and carbonate rocks Journal of Applied Geophysics; vol. 56, 2004, pp. 165-176.

Lucia Petrophysical parameters estimated from visual descriptions of carbonate rocks: a field classification of carbonate pore space Journal of Petroleum Technology, Mar. 1983, pp. 629-637.

Vashist et al Reservoir facies and their distribution in a heterogeneous carbonate reservoir: an integrated approach 68th Annual Technical Conference and Exhibition of the Society of Petroleum Engineers, Houston, Texas, Oct. 3-6, 1993, SPE 26498.

* cited by examiner

METHOD OF INTERPRETING WELL DATA

The subject matter of the present invention relates to a method of interpreting data derived from one or more wells, particularly log data derived from one or more wells in one or more logging operations. Even more specifically, the method relates to a method of identifying diagenetic surfaces in reservoirs.

BACKGROUND OF THE INVENTION

Today's hydrocarbon production stems to a large part from two types of reservoirs. One type is predominantly composed of siliciclastic rocks or sediments. The other reservoirs are classified as carbonate reservoirs. As the latter reservoir type is at the focus of the present invention, it is worth noting that the interpretation of log data derived from well measurement and the accuracy of the interpretation differ significantly depending on the type of reservoir. These differences emerge as a result of the internal structure of the two classes of deposits.

Siliciclastic sediments, such as sandstones and shale, develop through the attrition of other rocks. Their grains are sorted prior to deposition. Sandstones and shale are formed of sedimentary particles derived from sources outside the depositional basin. Siliciclastic sediments are relatively stable after deposition. As a result, the pore space in sandstones is mainly intergranular and its complexity depends on the degree of sorting.

In contrast, carbonates form in special environments and are biochemical in nature. They are essentially autochthonous, as they form very close to the final depositional sites. They are not transported and sorted in the same way as sandstones. Carbonates are usually deposited very close to their source and develop as a result of various processes. Their texture is more dependent on the nature of the skeletal grains than on external influences. Intrabasinal factors control facies development. Reefs, bioherms, and biostroms are examples of in-place local deposition where organisms have built wave-resistant structures above the level of adjacent time-equivalent sediments.

Carbonates are characterized by different types of porosity and have unimodal, bimodal, and other complex pore structure distributions. These distributions result in wide permeability variations for the same total porosity, making it difficult to predict for example the production efficiency for hydrocarbon. Carbonate rock texture produces spatial variations in permeability and capillary bound water volumes.

Carbonates are particularly sensitive to post-depositional diagenesis including dissolution, cementation, recrystallization, dolomitization, and replacement by other minerals. Calcite can be readily dolomitized, sometimes increasing porosity. Complete leaching of grains by meteoric pore fluids can lead to textural inversion which may enhance reservoir quality through dissolution or occlude reservoir quality through cementation. Burial compaction fracturing and stylolithification are common diagenetic effects in carbonates, creating high-permeability zones and permeability barriers or baffles, respectively. Diagenesis can cause dramatic changes in carbonate pore size and shape. On a large scale, porosity due to fracturing or dissolution of carbonate rocks can produce "pores" up to the size of caverns.

All carbonate sediments are composed of three textural elements which are defined as grains, matrix, and cement, respectively. In general, geologists have attempted to classify sedimentary rocks on a natural basis, but some schemes have genetic implications, i.e., knowledge or origin of a particular rock type is assumed.

The relative proportions of the components, among others, can be used to classify carbonate sediments. A widely used classification scheme is proposed by Dunham (see Dunham, "Classification of carbonate rocks according to depositional texture", in *Classification of carbonate rocks—A Symposium*, Ham, ed., volume 1, pages 108-121. AAPG Mem., 1962.) In Dunham, carbonates are classified based on the presence or absence of lime mud and grain support. Textures range from grainstone, rudstone, and packstone (grain-supported) to wackestone and mudstone (mud-supported). Where depositional texture is not recognizable, carbonates are classified as boundstone or crystalline. Within these carbonates, the porosity takes many forms, depending on the inherent fabric of the rock, and on the types of processes that can occur during and after deposition.

Another classification system, by Lucia (see Lucia, Petrophysical parameters estimated from visual description of carbonate rocks: a field classification of pore space. Journal of Petroleum Technology, 35:626-637, March 1983) is based on petrographical attributes and porosity. Dolomites are included in this classification scheme.

Pore type characterization is used in a classification scheme of Choquette and Pray (see P. W. Choquette and L. C. Pray. Geologic nomenclature and classification of porosity in sedimentary carbonates. PAPG Bull., 54:207-250, 1970). Choquette and Pray, in contrast to Dunham, classify carbonates according to fabric and nonfabric pore types. Examples of the former are inter- and intraparticle porosity, while those of the latter are fractures and vugs. Other classification schemes differentiate between primary and secondary pore spaces using the description based on classification according to Choquette and Pray.

Methods are known in which some of the petrographical information obtained using these classifications is used to improve the petrophysical evaluation of the geological formations.

Interpretation of well logs for use in subsurface geology is long-established and remains fundamental to the construction of accurate reservoir models. Well logs are used to detect the range and characteristics of rock types that exist within a reservoir, and seismic data together with geological knowledge are used to propagate this information into inter-well space. Well log data is also used to aid the development of depositional and sequence stratigraphic models, as well as to assess the distribution of petrophysical properties within a reservoir.

For example in SPE 26498, presented at the 68th SPE Annual Technical Conference and Exhibition, Houston, Tex., USA in Oct. 3-6, 1993, a method is presented that uses density, neutron porosity, sonic travel time, gamma ray and water saturation as input to a processing step. The processing uses correlation techniques to classify carbonates in the absence of core data.

Well log data is also used to aid the development of depositional and sequence stratigraphic models, as well as to assess the distribution of petrophysical properties within a reservoir.

Many of these techniques require accurate identification of both depositional facies and diagenetic overprints, and the placing of these within a stratigraphic model that offers a degree of predictability in regions of the reservoir with little or sparse data. This exercise necessarily requires the initial erection of valid criteria for well-to-well correlation, based on either lithostratigraphy (correlation based on depositional lithology) that will yield a simple stratigraphic model, or chronostratigraphy (correlation based on division of the stratigraphy into units of time bounded by coeval timelines). In turn, these improvement will result in a more sophisticated sequence stratigraphic model. The formulation of such models is vital in that they provide a framework for predictions of the hydrocarbon distribution, volume in-place, the geometry and continuity of flow units within the model, and the formulation of recovery strategies.

In a reservoir assessment, it is common to include data from more than one well. Most cross-well correlation methods utilize gamma, density, porosity, and resistivity logs. In carbonate fields, current correlation techniques often rely heavily upon gamma ray signatures, which are usually inferred to mark clay-rich horizons. In carbonate successions, these are often, but not exclusively, found either at the base of depositional sequences or near maximum flooding surfaces. Density logs mark changes in porosity and so can detect, for example, alternations of zones of reservoir quality and denser zones in stacked successions.

There exists a desire to improve the interpretation of well data, particularly for carbonate-type reservoirs.

SUMMARY OF THE INVENTION

According to an aspect of the invention there is provided a method of evaluating a formation penetrated by one or more wellbores, the method including the steps of measuring at least a first and a second property as well signatures, determining a divergence between the well signatures; and determining whether the divergence is indicative of a diagenetic surface in the formation.

The divergence can be a spatial divergence, e.g. across signatures measured in spatially distributed wells or along a single bur deviated well. The divergence can also be a stratigraphic divergence in the sequence and position of layers along a (vertical) well signature.

A surface can also be used to define the border of a layer. Therefore reference to a surface or surfaces herein is meant to include layer or layers as appropriate.

In a preferred embodiment, the well signatures are well logs acquired using for example known logging methods such as sonic, gamma-ray, nuclear magnetic resonance (NMR), or electromagnetic based measurements.

The first property can be characterized as being sensitive to the effects of primary deposition processes of the formation. Hence it is preferably sensitive to for example the rock composition in terms of different rock types (clay, shales, sand etc.). Gamma ray logs are for example known to mark clay-rich horizons.

In contrast the second property can be characterized as being sensitive to the effects of diagenetic processes and can be density, porosity, pore size, or permeability or properties related to any of these.

In a preferred embodiment of the invention, further data may be used to validate the existence of a diagenetic surface. Such data can be core data.

It is further anticipated to use the information gained from the new method to correlate diagenetic surfaces across a larger area using measurements from other wells.

Confirmed or even unconfirmed diagenetic surface can be made part of the data set used to build stratigraphic earth models or populated the input data to petrophysical reservoir model such as the PETREL™ reservoir software.

According to another aspect of the invention, there is provided a method that allows the distinction of a mainly diagenetically produced surface in geological strata from that formed from mainly depositional processes within carbonate rocks, but also within any other sedimentary rock including siliclastic, evaporite, or organic. The divergence of any wireline signature (including Density; Resistivity; Neutron; ECS etc.) from one that is known by interpretation from core material (or other geological data source) to be of primarily depositional origin (including Gamma; ECS etc.) is deduced to mark a diagenetic surface and/or layer rather than a depositional one. This enables an understanding of the processes responsible for the demarcation of reservoir or dense zones on the basis of both depositional and diagenetic processes, and also allows for more accurate timeline correlation to be performed using wireline data.

The proposed method allows the recognition of a diagenetic surface, and/or layer, whose porosity/permeability distribution is governed mainly by diagenetic phenomena (mainly either preferential dissolution or cementation), to be distinguished from a depositional surface or layer, using a combination of wireline logs.

In a preferred embodiment the method includes the steps of

Detection of any stratigraphic divergence between any given wireline depositional signal (e.g. Gamma) and the Density signature. This can be conducted on wells of any orientation. Any stratigraphic divergence may indicate a possible diagenetic surface and/or layer;

Use of core observation or other geological data source at these intervals to validate existence of diagenetic surface and/or layers; and Use of multi-well data to trace and correlate diagenetic surfaces and/or layers across field or regionally between fields.

Prior log interpretation methods do not often allow any differentiation to be made between those components of the signatures derived from the original depositional lithology, and those from subsequent diagenetic overprinting. Such a differentiation is important because the same depositional lithology may be found with distinct and differing diagenetic overprints in different parts of a reservoir or between reservoirs of the same formation, so apparently reducing the utility of well logs for the valid extrapolation of many reservoir characteristics into the inter-well volume. Such differentiation will therefore enable more accurate construction of 3D geological models because depositional lithologies can be interpolated with a reasonable predictability and hence accuracy, and diagenetic overprints can be simulated separately with either deterministic, simulated models, or by geostatistical methods.

These and other aspects of the invention will be apparent from the following detailed description of non-limitative examples and drawings.

DETAILED DESCRIPTION

Each stage of the invention is now described in more detail.

After a logging operation which may be performed using known wireline tools or logging-while-drilling (LWD) tools (step 10 of FIG. 1), a plurality of log signatures of the well are recorded. The logging and following interpretation according to the invention can be conducted on vertical, horizontal, or deviated wells. For the present example a gamma ray and a density log are measured and recorded.

The invention includes the step 11 of detecting any stratigraphic divergence between any given log signal known to be influenced mainly by depositional lithology like gamma ray logs and logging signal which can be influenced by diagenetic processes in the formation like the density logs.

Figure 2:
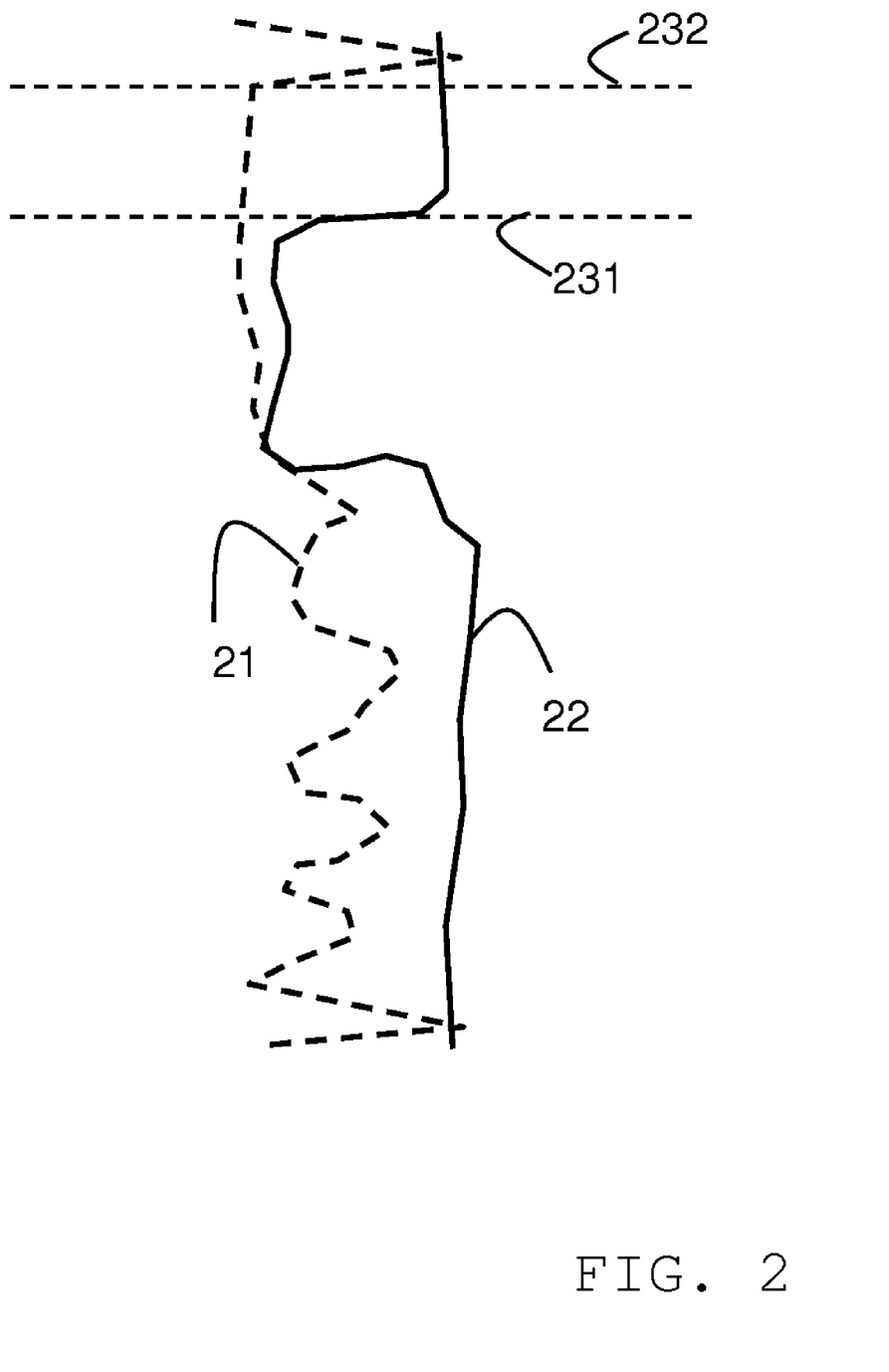
FIG. 2 illustrates one highlighted stratigraphic interval, schematically showing the divergence between Gamma and Density wireline logs.

In FIG. 2 there are shown a set of two wireline signatures in a deviated well through the Thamama Formation in the United Arabian Emirates.: The gamma ray log signature 21 is shown as dashed line and the density log 22 as solid line. The gamma peaks and density changes are offset at many stratigraphic intervals.

By determining stratigraphic intervals where there is a stratigraphic divergence between these two signatures (step 11 of FIG. 1), provide an indication for the presence of a possible diagenetic surface(s) and/or layer(s) at specific locations or depths.

In FIG. 2 a lower dotted line 231 indicates such a possible diagenetic surface. The interval between the dotted lines 231 and 24 designate a possible diagenetic layer, i.e., a layer whose porosity and permeability is controlled primarily by diagenetic processes. Such a process can be for example preferential cementation that has occluded porosity leading to reduced total porosity and permeability. Reduced total porosity and permeability are reflected in the increase in density observed in the log 22 at an interval where the corresponding gamma-ray log 21 shows no apparent change. In line with the procedure of FIG. 1, the divergence of the two log signature identified a possible location 231 of a diagenetic surface.

It is however not always possible to identify the presence of such a surface with certainty without performing further tests or making use of further data characteristic of the formation around the location of the surface.

Figure 1:
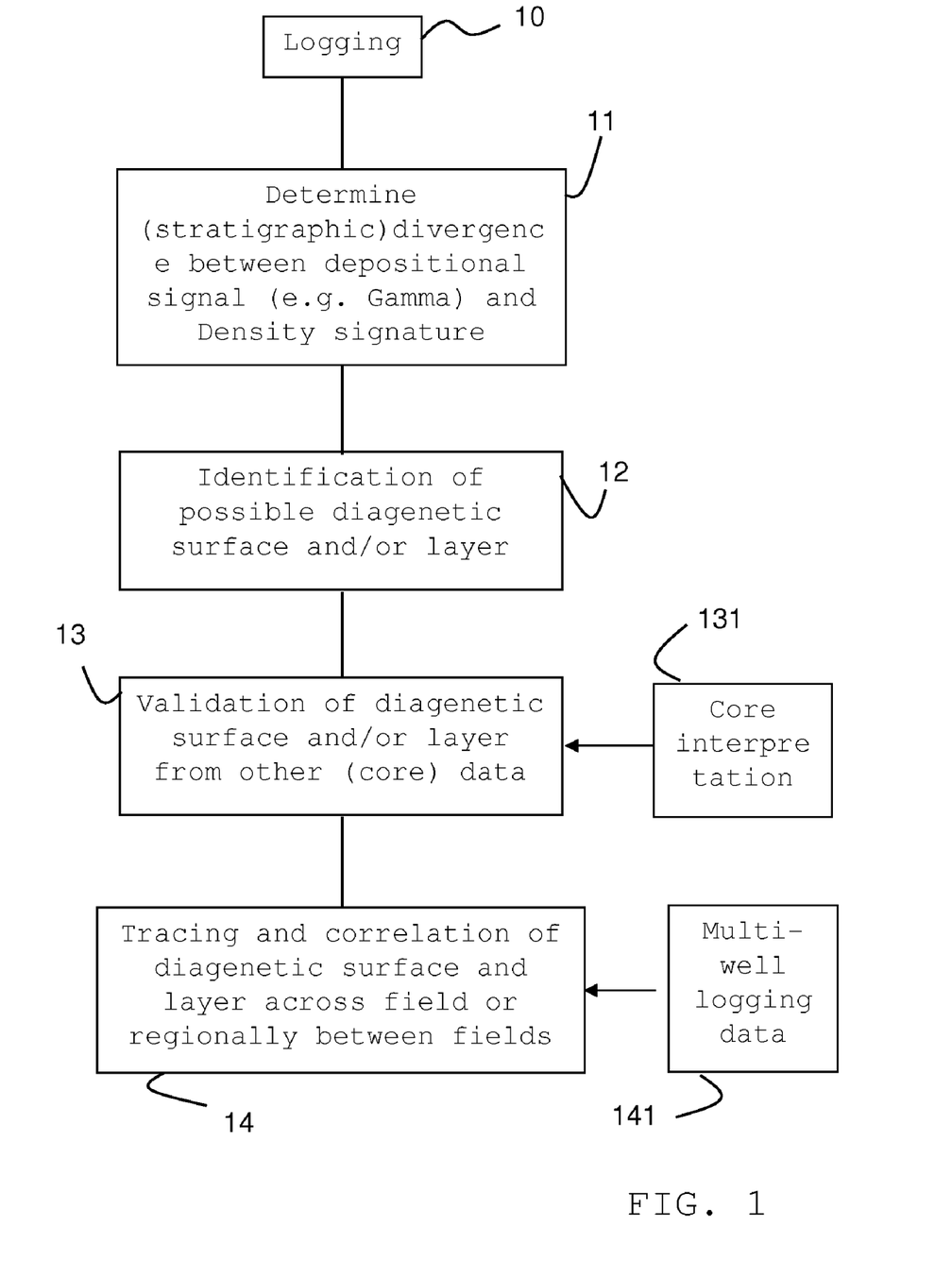
FIG. 1 illustrates steps in accordance with an embodiment of the present invention.

In the step 13 of FIG. 1 core observations 131 at these stratigraphic intervals are conducted to validate the existence of diagenetic surface and/or layer. In case of a diagenetic layer the depositional lithology is expected to show no or only very minor changes across the interval in which the density log shows a major change in density.

Figure 3A:
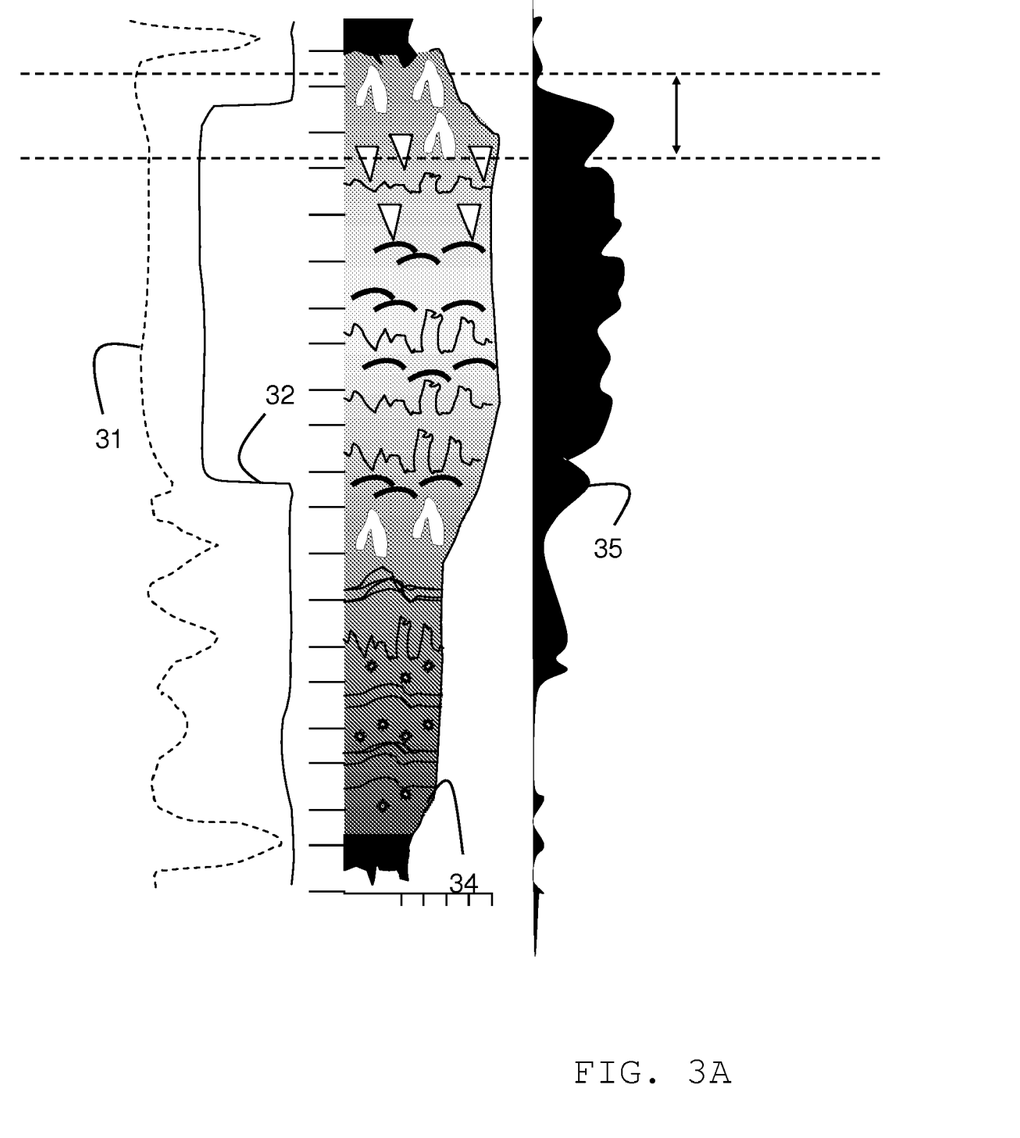
FIG. 3A illustrates wireline signature, geological log, and porosity derived from plugs at 1 ft intervals.
Figure 3B:
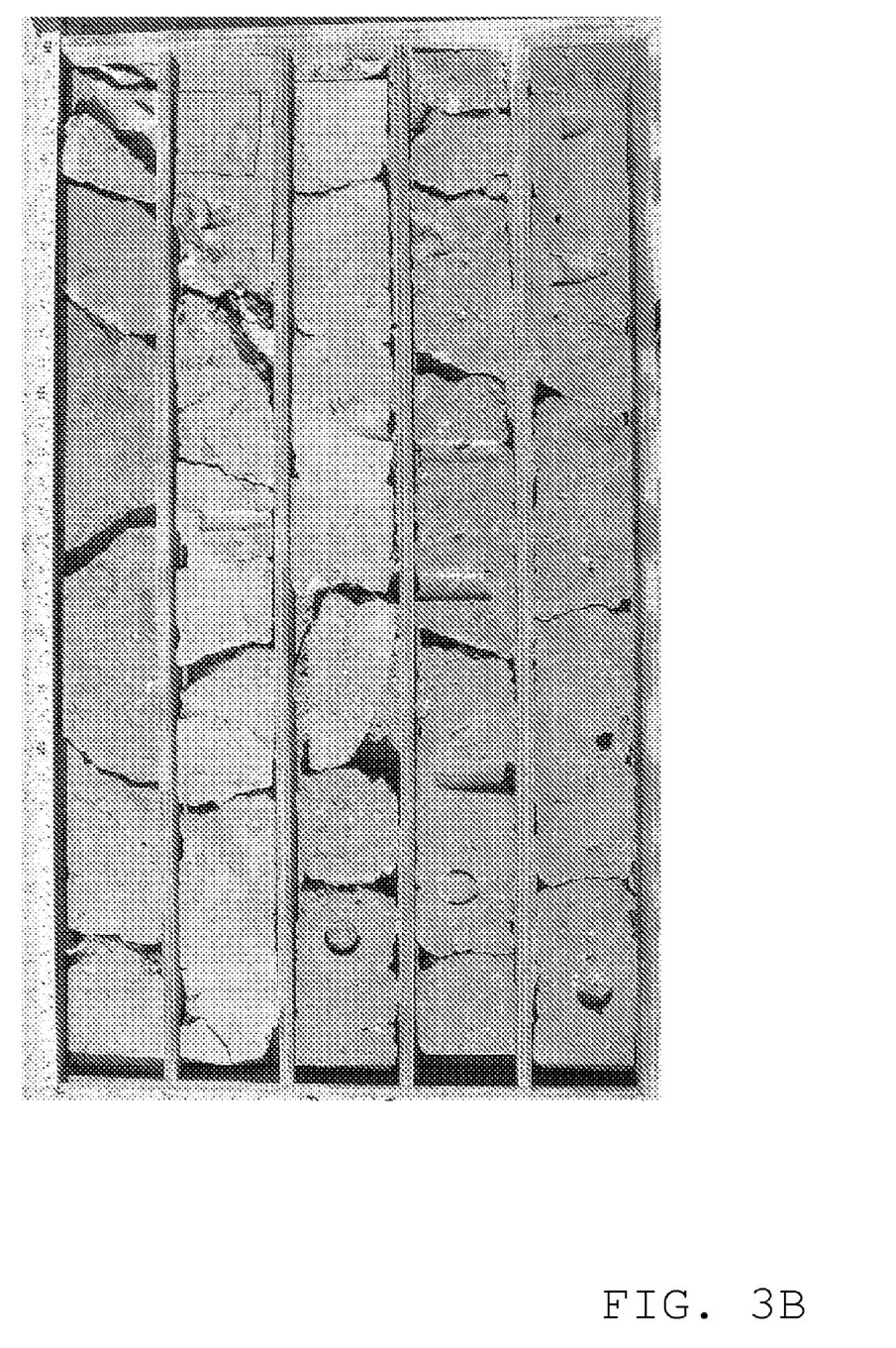
FIG. 3B is a photograph of core samples taken at a depth interval identified in the logs of FIG. 3A.

FIG. 3A illustrates wireline well signatures including a gamma ray log 31 and a density log 32, a geological log 34, and porosity log 35 derived from plugs at 1 ft intervals. The gamma ray log 31 and a density log 32 are similar to those shown in FIG. 2. The geological log 34 depicts the formation composition as layers of symbols with each different symbol being representative of a type of deposition or rock encountered. The porosity log 35 is derived from core porosity measurements. Taken from the interval between lines 331 and 332 several samples are shown in FIG. 3B.

There is no noteworthy change in depositional lithology from one layer to the other, thus confirming that the transition is a diagenetic one. In the core samples the porosity changes within the observed interval from 20 per cent (10-100 mD permeability) to 5 percent (0.1 mD). In this case, the transition marks the change from relatively poorly cemented to well-cemented layers.

As a result, the stratigraphic interval above and below the marked change in porosity as indicated from density can be identified as being the result of a change in diagenetic overprint, due to either a difference in the relative amount of cementation (decrease in porosity/permeability) in the lower layers, or dissolution (increase in porosity/permeability) in the upper layer.

Having established the diagenetic meaning of the divergence between well signatures for any number of stratigraphic intervals, the relative spatial effects of diagenesis across a reservoir can then be inferred by correlation using any number of additional well data sets 141 from other wells. This step 14 of FIG. 1 allows for example the lateral tracing of digenetic surfaces and inferred relationship to depositional stratigraphy or lateral or other spatial changes in thickness of preferentially cemented or uncemented or dissolved or undissolved units in parts of the reservoir.

These data can be used to trace and correlate diagenetic surfaces and/or layer both within the same field, as well as regionally between fields.

Figure 4:
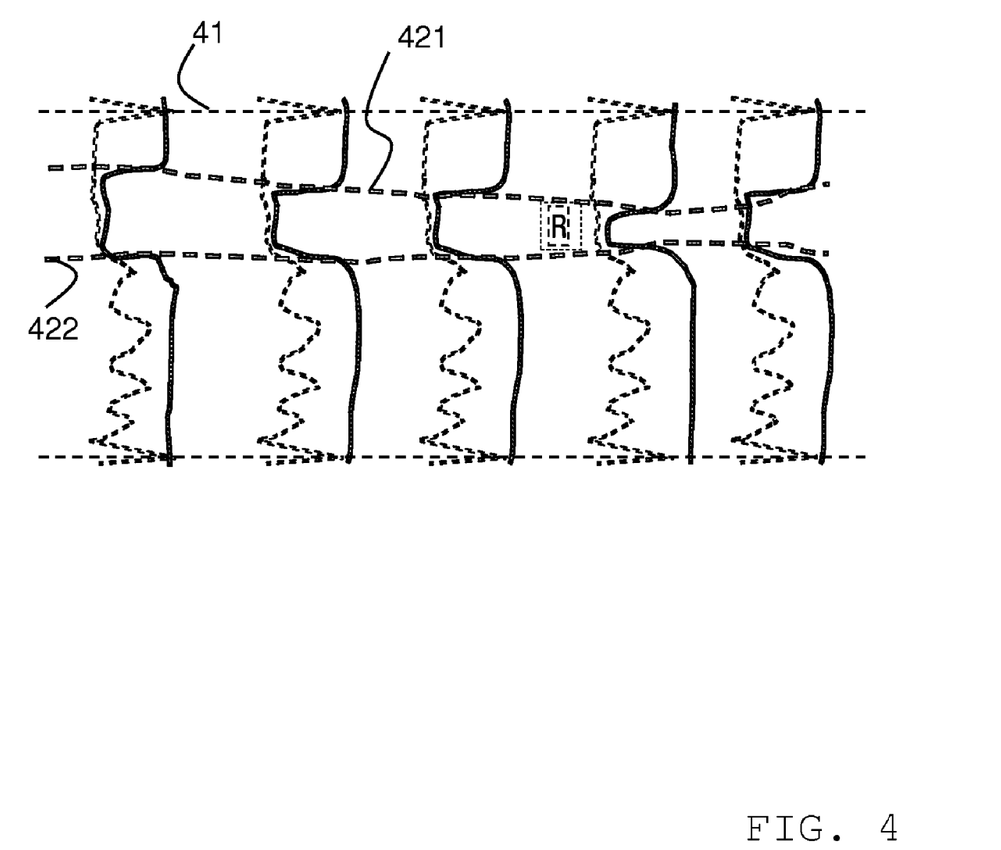
FIG. 4 illustrates correlation of five pairs of schematic wireline logs across a structure of a field.

FIG. 4 shows the correlation of five pairs of schematic wireline logs across the structure of field. Using the Gamma log denoted by dashed lines a depositional surface 41 across the reservoir can be detected and provides a timeline 41 across the reservoir. This can be used to correlate well signatures across the reservoir. Correlation using the density log, however, tracks a diagenetic surface 421. In addition, this surface is seen to diverge to different degrees from the Gamma log signature, thus marking the thickness of the cemented reservoir R as defined by the layer between these two signatures 421, 422 at any given location. The thickness of the reservoir R is therefore also diagenetically determined.

The relative effects of diagenesis, in this case the lateral tracing of a diagenetic surfaces and inferred relationship to depositional stratigraphy, the lateral change in thickness of preferentially cemented or uncemented units, can hence be inferred by correlation using additional wireline data sets from other wells within the same field.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of evaluating a formation penetrated by one or more wellbores, the method comprising the steps of
   measuring at least a first and a second property as well signatures, wherein the first property is sensitive to the effects of primary deposition processes of the formation, and wherein the second property is sensitive to the effects of diagenetic processes;
   determining a divergence between the well signatures; and
   using the determined divergence between the well signatures to identify a diagenetic surface in the formation.

2. The method of claim 1 wherein the divergence is a spatial divergence.

3. The method of claim 2 wherein the divergence is a stratigraphic divergence.

4. The method of claim 1 wherein the well signatures are well logs.

5. The method of claim 4 wherein a well log is generated using a logging measurement selected from a group consisting of sonic, gamma-ray, nuclear magnetic resonance (NMR), and electromagnetic based measurements.

6. The method of claim 1 wherein the second property is related to density, porosity, pore size, or permeability.

7. The method of claim 1 further comprising the step of using further data to validate the existence of a diagenetic surface.

8. The method of claim 7 wherein the further data are core data.

9. The method of claim 1 further comprising the step of correlating diagenetic surfaces identified in two or more well signatures.

10. The method of claim 1 further comprising the step of introducing identified diagenetic surfaces into a stratigraphic earth model.

11. The method of claim 1 further comprising the step of introducing identified diagenetic surfaces into a petrophysical reservoir model.

12. The method of claim 1 further comprising the step of combining identified diagenetic surfaces to determine boundaries of flow units in a reservoir model.

13. The method of claim 1 further comprising the step of combining diagenetic surfaces identified using a method in accordance with claim 1 and diagenetic surfaces identified by other methods into a model.

14. The method of claim 1 applied to reservoirs of predominantly carbonate rock.

15. The method of claim 1 further comprising the step of classifying rock types.

* * * * *